US012791852B2

(12) United States Patent
Ide

(10) Patent No.: US 12,791,852 B2
(45) Date of Patent: Nov. 10, 2026

(54) MIRROR APPARATUS WITH A FRAME MEMBER INCLUDING A PAIR OF STANDING WALLS

(71) Applicant: HAMAMATSU PHOTONICS K.K., Hamamatsu (JP)

(72) Inventor: Tomoyuki Ide, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 305 days.

(21) Appl. No.: 18/623,385

(22) Filed: Apr. 1, 2024

(65) Prior Publication Data

US 2024/0329391 A1 Oct. 3, 2024

(30) Foreign Application Priority Data

Apr. 3, 2023 (JP) ................................ 2023-059989

(51) Int. Cl.
*G02B 26/08* (2006.01)
*G02B 26/10* (2006.01)

(52) U.S. Cl.
CPC ....... *G02B 26/101* (2013.01); *G02B 26/0816* (2013.01)

(58) Field of Classification Search
CPC .............. G02B 26/101; G02B 26/0816; G02B 26/0833; G02B 26/085; G02B 26/0866; G02B 26/10
See application file for complete search history.

(56) References Cited

U.S. PATENT DOCUMENTS

2020/0249470 A1 * 8/2020 Suzuki .................. G02B 26/10

FOREIGN PATENT DOCUMENTS

JP 2016-099567 A 5/2016

* cited by examiner

*Primary Examiner* — Euncha P Cherry
(74) *Attorney, Agent, or Firm* — Faegre Drinker Biddle & Reath LLP

(57) ABSTRACT

A mirror apparatus includes a base portion; a mirror unit; a frame member; and a window member. The frame member includes a first wall portion, a second wall portion, and a pair of standing wall portions. The window member is disposed on a top surface of the first wall portion and a top surface of the second wall portion, and is inclined with respect to a mirror surface. A top surface of each of the pair of standing wall portions includes a flat portion. A width of the top surface and a width of a bottom surface of each of the pair of standing wall portions are wider than a width of the first wall portion and a width of the second wall portion. At least a part of the bottom surface of each of the pair of standing wall portions is in contact with the base portion.

16 Claims, 7 Drawing Sheets

MIRROR APPARATUS WITH A FRAME MEMBER INCLUDING A PAIR OF STANDING WALLS

TECHNICAL FIELD

One aspect of the present disclosure relates to a mirror apparatus.

BACKGROUND

There is a mirror apparatus which includes a mirror unit including a mirror portion that is rotatable, and in which a glass plate is supported by a frame-shaped member disposed on a base portion, to face the mirror portion (for example, refer to FIG. 7 in Japanese Unexamined Patent Publication No. 2016-099567). In the mirror apparatus described in Patent Literature 1, the mirror portion is inclined with respect to the glass plate by disposing the mirror unit such that the mirror portion is inclined, and accordingly, reflected light reflected by the glass plate is reflected in a direction in which the reflected light does not affect the function of the mirror unit.

SUMMARY

In the mirror apparatus described above, in order to achieve the same object, it is considered that instead of the mirror unit, the glass plate is disposed at an angle. On the other hand, in this case, since a configuration of a glass plate side of the mirror apparatus is inclined with respect to a bottom surface of the base portion, for example, it may be difficult to mount the mirror apparatus on an external device or the like.

Therefore, an object of one aspect of the present disclosure is to provide a mirror apparatus that can be suitably mounted even when a window member is disposed at an angle.

[1] A mirror apparatus according to one aspect of the present disclosure includes "a base portion; a mirror unit including a movable portion configured to swing around a predetermined axis, and a mirror surface formed on the movable portion, and disposed on the base portion in a first direction; a frame member disposed on the base portion; and a window member disposed on the frame member. The frame member includes a first wall portion, a second wall portion facing the first wall portion in a second direction perpendicular to the first direction, and a pair of standing wall portions facing each other in a third direction perpendicular to the first direction and the second direction. A height of the first wall portion is lower than a height of the second wall portion. The window member is disposed on a top surface of the first wall portion and a top surface of the second wall portion, and is inclined with respect to the mirror surface. A top surface of each of the pair of standing wall portions includes a flat portion. A width of the top surface and a width of a bottom surface of each of the pair of standing wall portions in the third direction are wider than a width of the first wall portion and a width of the second wall portion in the second direction. At least a part of the bottom surface of each of the pair of standing wall portions is in contact with the base portion."

In the mirror apparatus according to [1], the height of the first wall portion is lower than the height of the second wall portion, and the window member is disposed on the top surface of the first wall portion and the top surface of the second wall portion, and is inclined with respect to the mirror surface. Accordingly, a direction in which light reflected by the window member travels can be made different from a direction in which light reflected by the mirror surface travels, and the occurrence of a situation where the light reflected by the window member becomes noise light can be suppressed. In addition, the top surface of each of the pair of standing wall portions includes the flat portion. Accordingly, even when the window member is disposed at an angle, the mirror apparatus can be accurately mounted by using the flat portion as a reference. In addition, the width of the top surface of each of the pair of standing wall portions is wider than the width of the first wall portion and the width of the second wall portion. Accordingly, for example, during mounting, the top surfaces of the standing wall portions are easily suctioned, so that the mounting of the mirror apparatus can be facilitated. Further, the width of the bottom surface of each of the pair of standing wall portions is wider than the width of the first wall portion and the width of the second wall portion, and at least a part of the bottom surface of each of the pair of standing wall portions is in contact with the base portion. Accordingly, the frame member can be firmly fixed to the base portion. In addition, since the widths of the top surface and the bottom surface of each of the pair of standing wall portions are wider than the width of the first wall portion and the width of the second wall portion, the strength of the standing wall portions can be increased, and for example, when a jig for suction or the like is brought into contact with the top surfaces of the standing wall portions during mounting, damage to the standing wall portions can be suppressed. Therefore, according to the mirror apparatus according to [1], even when the window member is disposed at an angle, the mirror apparatus can be suitably mounted.

[2] According to [1], in the mirror apparatus according to one aspect of the present disclosure, "an entirety of the bottom surface of each of the pair of standing wall portions may be in contact with the base portion." In this case, the frame member can be more firmly fixed to the base portion.

[3] According to [1] or [2], in the mirror apparatus according to one aspect of the present disclosure, "a length of the window member in the third direction may be longer than a width of each of the pair of standing wall portions in the third direction." In this case, the blocking of light traveling toward the mirror surface or light reflected by the mirror surface by the standing wall portions can be suppressed.

[4] According to any one of [1] to [3], in the mirror apparatus according to one aspect of the present disclosure, "a length of the window member in the third direction may be longer than a sum of widths of the pair of standing wall portions in the third direction." In this case, the blocking of light traveling toward the mirror surface or light reflected by the mirror surface by the standing wall portions can be suppressed.

[5] According to any one of [1] to [4], in the mirror apparatus according to one aspect of the present disclosure, "the second wall portion may include a portion in which a width of the top surface in the second direction is narrower than a width of a bottom surface in the second direction." In this case, the blocking of light traveling toward the mirror surface or light reflected by the mirror surface by the second wall portion higher than the first wall portion can be suppressed.

[6] According to any one of [1] to [5], in the mirror apparatus according to one aspect of the present disclosure, "a height of each of the pair of standing wall portions may be higher than the height of the second wall portion." In this case, the mounting of the mirror apparatus with reference to the top surfaces of the standing wall portions can be easily performed.

[7] According to any one of [1] to [6], in the mirror apparatus according to one aspect of the present disclosure, "in the first direction, an entirety of the window member may be located on a base portion side with respect to the top surface of each of the pair of standing wall portions." In this case, the mounting of the mirror apparatus with reference to the top surfaces of the standing wall portions can be easily performed.

[8] According to any one of [1] to [7], in the mirror apparatus according to one aspect of the present disclosure, "the frame member may be fixed to the base portion by a first adhesive material, and the first adhesive material may be disposed between the frame member and the base portion over an entire circumference." In this case, the frame member can be firmly fixed to the base portion.

[9] According to any one of [1] to [8], in the mirror apparatus according to one aspect of the present disclosure, "the frame member may further include a pair of third wall portions facing each other in the third direction, and the pair of standing wall portions may be disposed outside the pair of third wall portions when viewed in the first direction." In this case, the strength of the frame member can be increased, and for example, when a jig for suction or the like is brought into contact with the top surfaces of the standing wall portions during mounting, damage to the frame member caused by stress generated in the standing wall portions can be suppressed.

[10] According to [9], in the mirror apparatus according to one aspect of the present disclosure, "the window member may be fixed to top surfaces of the pair of third wall portions by a second adhesive material." In this case, the bending of the frame member when fixed can be suppressed.

[11] According to [9] or [10], in the mirror apparatus according to one aspect of the present disclosure, "the pair of standing wall portions may be integrally formed with the pair of respective third wall portions." In this case, the strength of the frame member can be increased. In addition, the molding of the frame member can be facilitated.

[12] According to any one of [1] to [11], in the mirror apparatus according to one aspect of the present disclosure, "a gap may be formed at least one of between the window member and the top surface of the first wall portion and between the window member and the top surface of the second wall portion." In this case, the occurrence of dew condensation inside the mirror apparatus can be suppressed.

[13] According to any one of [1] to [12], the mirror apparatus according to one aspect of the present disclosure "may further include a magnet unit. The base portion may include a disposition surface on which the frame member is disposed, and a recess that is open on the disposition surface may be formed in the base portion. The magnet unit may be disposed in the recess." In such a mirror apparatus as well, the above-described effect that the mirror apparatus can be suitably mounted even when the window member is disposed at an angle is achieved.

[14] According to [13], in the mirror apparatus according to one aspect of the present disclosure, "a surface of the base portion on a side opposite to the disposition surface may extend parallel to the flat portion." In this case, the mounting of the mirror apparatus with reference to the flat portions can be further facilitated.

[15] According to any one of [1] to [14], in the mirror apparatus according to one aspect of the present disclosure, "each of the pair of standing wall portions may extend continuously between the first wall portion and the second wall portion when viewed in the third direction." In this case, the mounting of the mirror apparatus with reference to the top surfaces of the standing wall portions can be further facilitated.

[16] According to any one of [1] to [15], in the mirror apparatus according to one aspect of the present disclosure, "the axis may be parallel to the third direction." In such a mirror apparatus as well, the above-described effect that the mirror apparatus can be suitably mounted even when the window member is disposed at an angle is achieved.

According to one aspect of the present disclosure, it is possible to provide the mirror apparatus that can be suitably mounted even when the window member is disposed at an angle.

DETAILED DESCRIPTION

Figure 1:
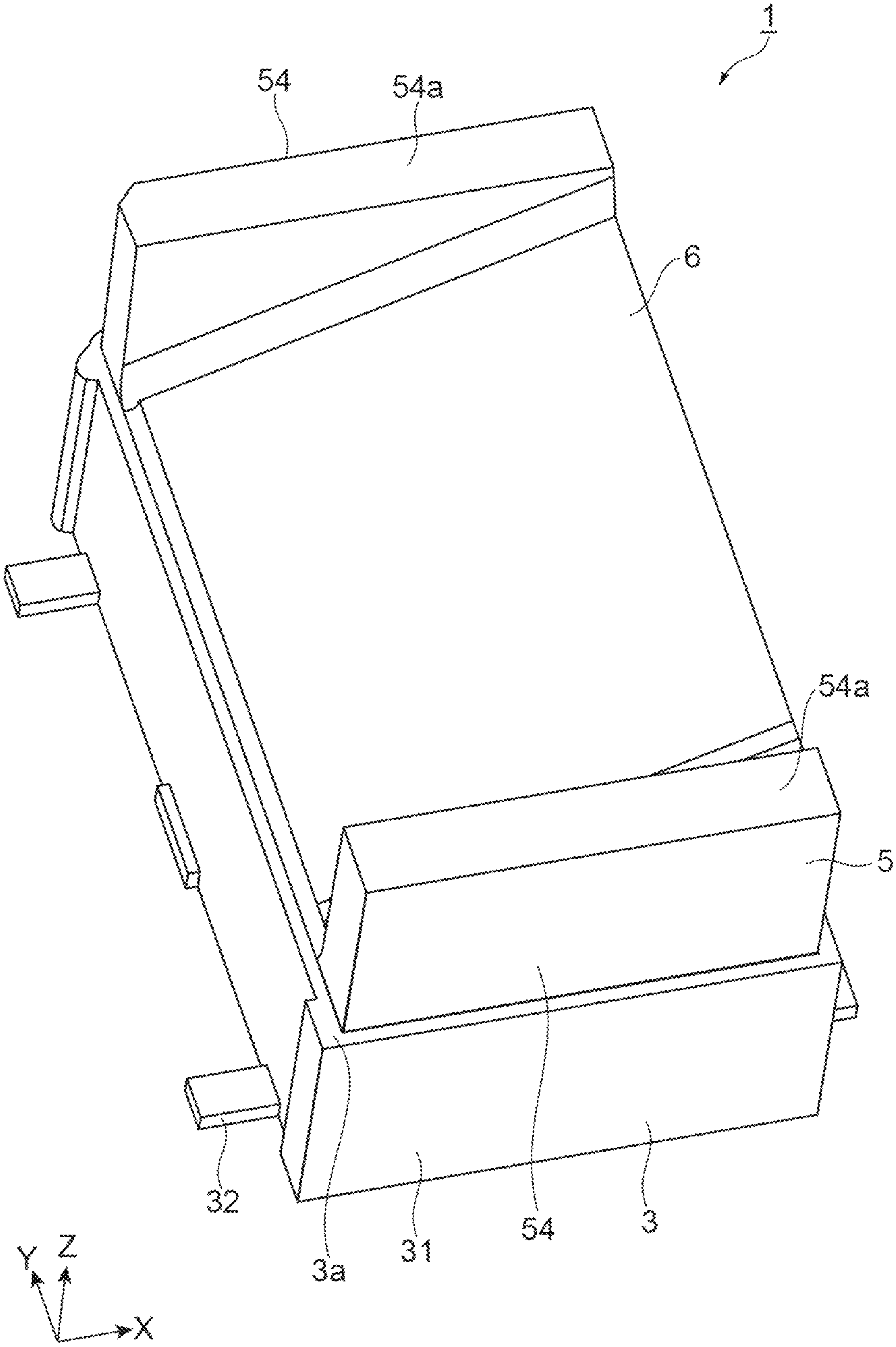
FIG. 1 is a perspective view of a mirror apparatus according to an embodiment.

Hereinafter, an embodiment of the present disclosure will be described in detail with reference to the drawings. In the following description, the same reference signs are used for the same or equivalent elements, and duplicate descriptions will be omitted.

As shown in FIGS. 1 to 6, a mirror apparatus 1 includes a mirror unit 2, a base portion 3, a magnet unit 4, a frame member 5, and a window member 6. First, the mirror unit 2 will be described with reference to FIG. 7. In this example, the mirror unit 2 is formed of only a mirror device 10, but may further include, for example, a base member to which the mirror device 10 is fixed. Hereinafter, as shown in each drawing, an X direction (second direction), a Y direction (third direction), and a Z direction (first direction) will be set and described. The X direction, the Y direction, and the Z direction are directions perpendicular to each other.

[Mirror Device (Mirror Unit)]

The mirror device 10 includes a support portion 11 and a movable mirror portion 12 that is swingable with respect to the support portion 11. The movable mirror portion 12 includes a movable portion 13, a pair of coupling portions 14, and a mirror 15. The support portion 11, the movable portion 13, and the pair of coupling portions 14 are integrally formed from, for example, a silicon on insulator (SOI) substrate. Namely, the mirror device 10 is a micro-electro-mechanical systems (MEMS) device formed using a semiconductor material.

The support portion 11 is formed in, for example, a rectangular frame shape. The movable portion 13 is formed in, for example, a rectangular plate shape, and is disposed inside the support portion 11 (surrounded by the support portion 11) when viewed in an optical axis direction. The optical axis direction is a direction perpendicular to a plane on which the support portion 11 and the movable mirror portion 12 are disposed, and in this example, is a direction perpendicular to the mirror 15. In this example, the optical axis direction is parallel to the Z direction. The movable portion 13 is coupled to the support portion 11 by the pair of coupling portions 14 so as to be swingable around an axis A. In this example, the axis A is parallel to the Y direction.

The movable portion 13 includes a first portion 131 and a second portion 132. The first portion 131 is formed in, for example, a circular shape when viewed in the optical axis direction. The second portion 132 is formed in, for example, a rectangular ring shape when viewed in the optical axis direction. The first portion 131 is disposed inside the second portion 132 (surrounded by the second portion 132) when viewed in the optical axis direction, and is connected to the second portion 132 by a plurality (in this example, two) of connecting portions 133. A gap is formed between the first portion 131 and the second portion 132 except for the plurality of connecting portions 133. The connecting portions 133 are located, for example, at central portions of two sides of a rectangular inner edge of the second portion 132, the two sides being parallel to the axis A.

The pair of coupling portions 14 are disposed on the axis A in the gap between the support portion 11 and the movable portion 13 so as to interpose the movable portion 13 therebetween. In this example, each of the coupling portions 14 is formed in an oblong plate shape, and extends along the axis A. Each of the coupling portions 14 functions as a torsion bar.

The mirror 15 is provided on the first portion 131 of the movable portion 13. The mirror 15 is formed on a surface on one side of the first portion 131 in the optical axis direction. The mirror 15 is formed, for example, in a circular, elliptical, or rectangular film shape from a metal material such as aluminum, aluminum-based alloy, gold, or silver. A surface of the mirror 15 on a side opposite to the movable portion 13 forms a mirror surface 15*a* extending perpendicularly to the optical axis direction. A center of the mirror 15 coincides with a center of the first portion 131 (a center of the mirror device 10) when viewed in the optical axis direction. In the mirror device 10, since the mirror 15 is provided on the first portion 131 connected to the second portion 132 via the plurality of connecting portions 133, even when the movable portion 13 swings around the axis A at a resonance frequency level, the occurrence of deformation such as bending in the mirror 15 can be suppressed.

Further, the mirror device 10 includes a coil 16 and a pair of electrode pads 17*a* and 17*b*. The coil 16 is provided in the second portion 132 of the movable portion 13. The coil 16 is wound in a spiral shape a plurality of times in a region (namely, the second portion 132) outside the mirror 15 when viewed in the optical axis direction. A magnetic field generated by the magnet unit 4 acts on the coil 16.

The coil 16 is made of, for example, a metal material such as copper, and is disposed in a groove formed on a surface of the movable portion 13. Namely, the coil 16 is embedded in the movable portion 13. One end of the coil 16 is connected to the electrode pad 17*a* via a wiring (not shown), and the other end of the coil 16 is connected to the electrode pad 17*b* via a wiring (not shown). A wire (not shown) for electrically connecting the mirror device 10 to an external device (for example, a power supply device or the like) is connected to each of the electrode pads 17*a* and 17*b*.

An example of a method for driving the mirror device 10 will be described. As one example, a high-frequency drive current is applied to the coil 16. At this time, since the magnetic field generated by the magnet unit 4 acts on the coil 16, a Lorentz force is generated in the coil 16. Accordingly, for example, the movable portion 13 is swung around the axis A at the resonance frequency level. Light from a predetermined light source can be reflected and scanned by the mirror 15 (mirror surface 15*a*) by driving the mirror device 10 in such a manner. As another example, a drive current of a constant magnitude may be applied to the coil 16. In this case, the movable portion 13 rotates around the axis A according to the magnitude of the drive current, and stops at a predetermined rotation angle. In such a manner, the movable portion 13 may be statically driven (linear drive).

[Mirror Apparatus]

A configuration of each part of the mirror apparatus 1 will be described with reference to FIGS. 1 to 6. The base portion 3 includes a body portion 31 formed from a resin material, and a metal plate portion 32 formed from a metal material, and has a substantially rectangular parallelepiped outer shape as a whole. The base portion 3 has a disposition surface 3*a* and a bottom surface 3*b*. The disposition surface 3*a* is a surface on the one side in the Z direction, and forms a top surface of the base portion 3. The bottom surface 3*b* is a surface on the other side in the Z direction, and is located opposite to the disposition surface 3*a*. In this example, the disposition surface 3*a* and the bottom surface 3*b* are flat surfaces perpendicular to the Z direction, and are parallel to each other. The disposition surface 3*a* is formed by the body portion 31, and the bottom surface 3*b* is formed by the body portion 31 and the metal plate portion 32. Namely, the metal plate portion 32 is disposed at a bottom portion of the base portion 3 so as to form a part of the bottom surface 3*b*.

Figure 6:
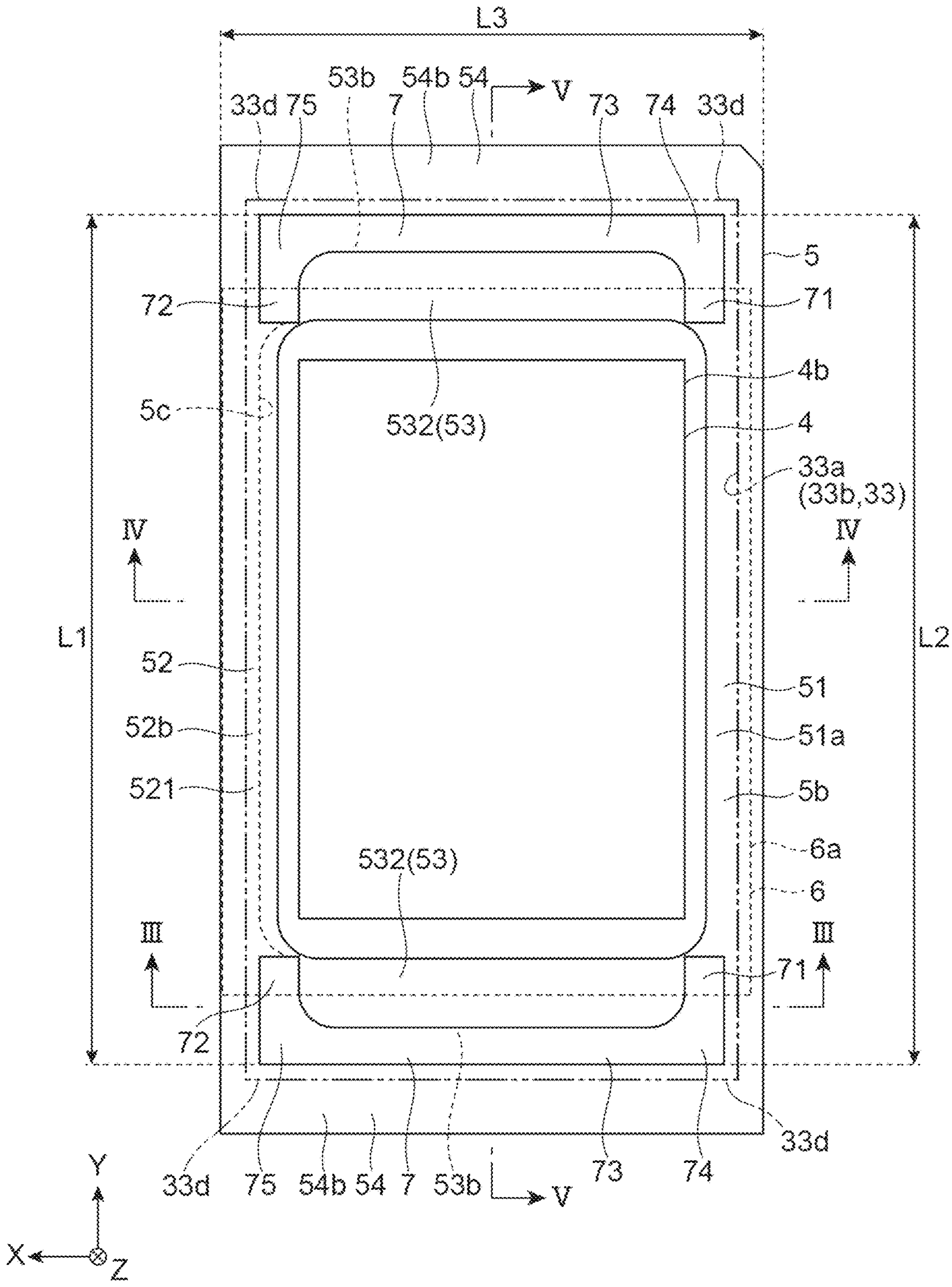
FIG. 6 is a view of a frame member and a magnet unit when viewed from the bottom surface side.
Figure 7:
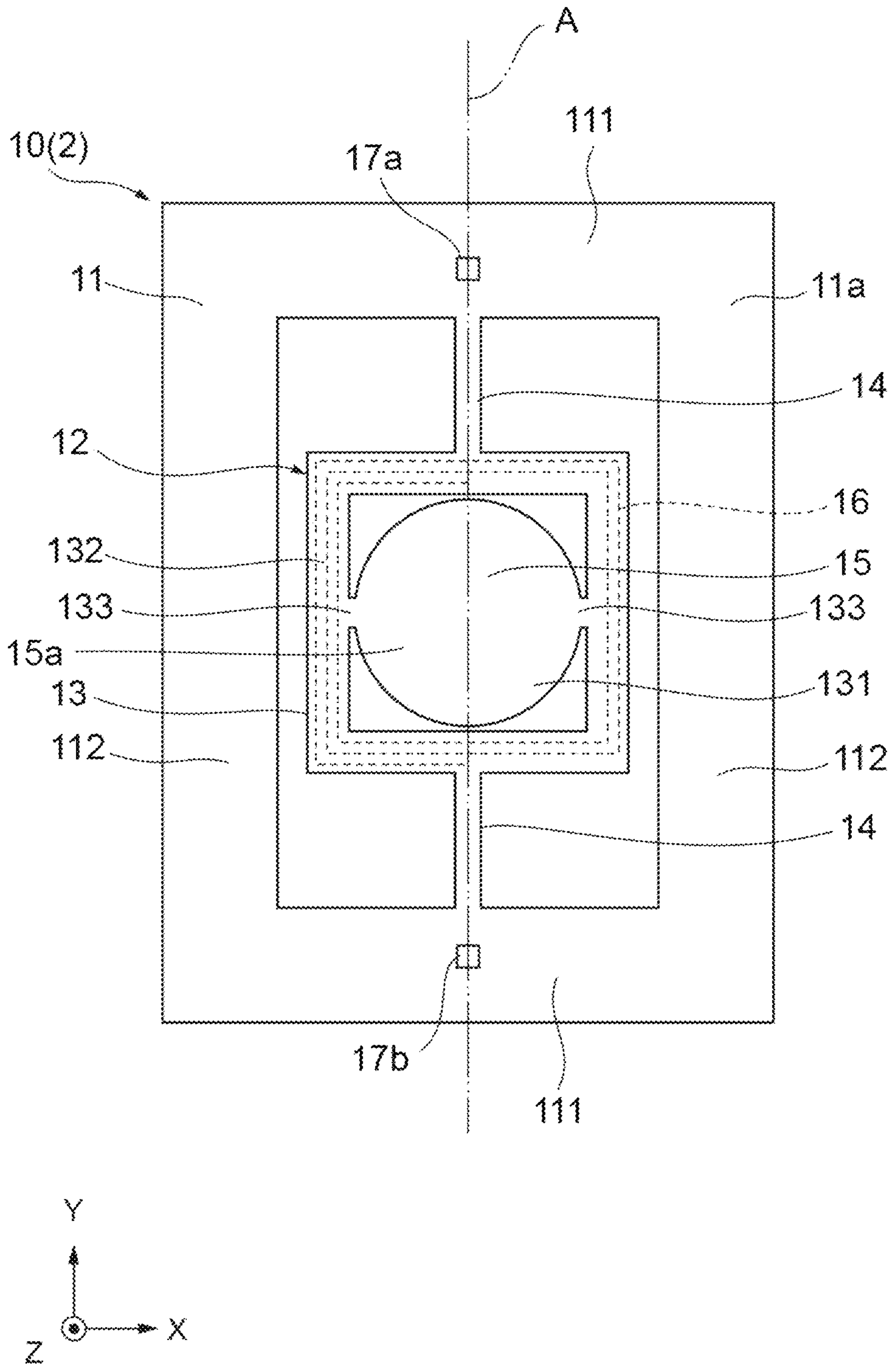
FIG. 7 is a plan view of a mirror unit.

A recess 33 that is open on the disposition surface 3*a* is formed in the base portion 3. In this example, an opening edge 33*a* of the recess 33 (an edge of the recess 33 on the disposition surface 3*a*) is formed in a substantially oblong shape having long sides parallel to the Y direction. In FIG. 6, the opening edge 33*a* is indicated by a two-dot chain line. A side surface 33*b* (inner surface) of the recess 33 is formed by the body portion 31, and a bottom surface 33*c* of the recess 33 is formed by the metal plate portion 32.

Figure 2:
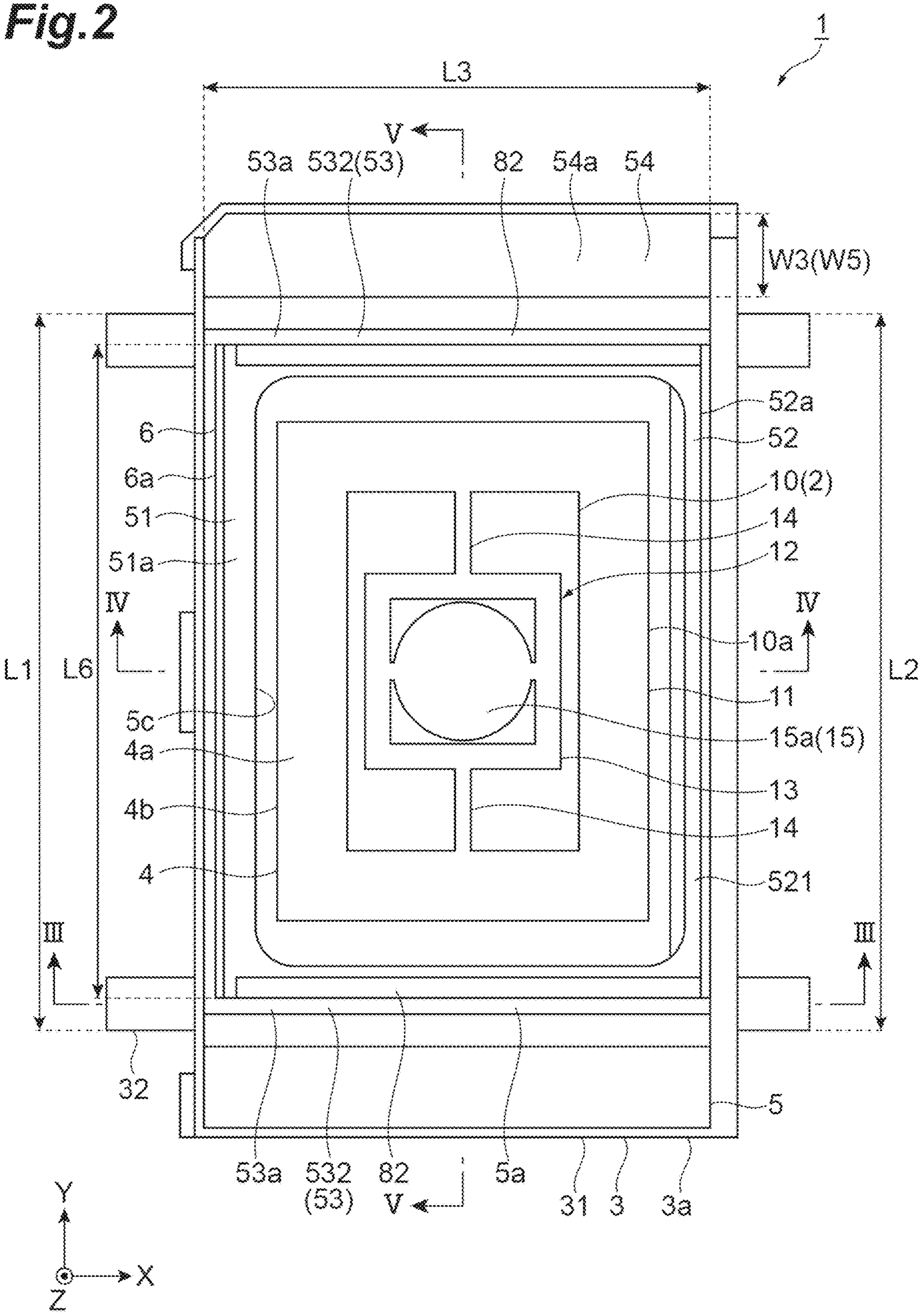
FIG. 2 is a plan view of the mirror apparatus.
Figure 3:
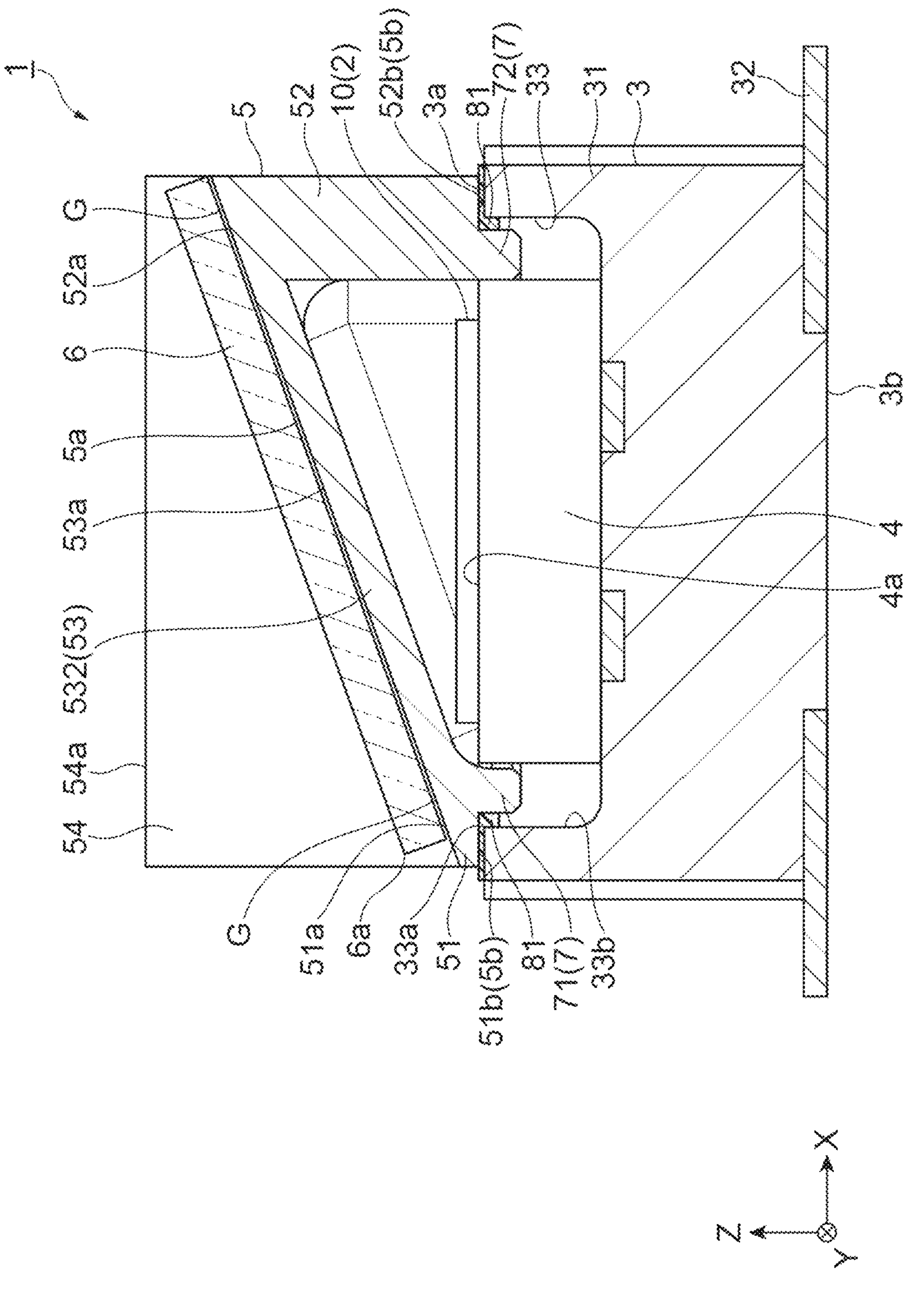
FIG. 3 is a cross-sectional view taken along line III-III of FIG. 2.

The magnet unit 4 is disposed in the recess 33. The magnet unit 4 is disposed on the bottom surface 33*c* of the recess 33. The magnet unit 4 includes, for example, a plurality of permanent magnets arranged in a Halbach array, and is formed in a substantially rectangular parallelepiped shape as a whole. The magnet unit 4 generates a magnetic field acting on the coil 16 of the mirror device 10. As shown in FIGS. 2 and 6, the magnet unit 4 is formed, for example, in an oblong shape having long sides parallel to the Y direction, when viewed in the Z direction.

The mirror device 10 (mirror unit 2) is disposed on the magnet unit 4 in the Z direction. More specifically, the mirror device 10 is disposed on a top surface 4*a* (a surface on a window member 6 side) of the magnet unit 4 via the support portion 11 such that the mirror surface 15*a* faces the one side (window member 6 side) in the Z direction and the axis A is parallel to the Y direction. As shown in FIG. 2, when viewed in the Z direction, the entirety of an outer edge 10*a* of the mirror device 10 is located inside an outer edge 4*b* of the magnet unit 4. In a case where the mirror unit 2 includes a base member to which the mirror device 10 is fixed, the mirror unit 2 may be disposed on the magnet unit 4 with the base member interposed therebetween.

The frame member 5 is disposed on the disposition surface 3*a* of the base portion 3. The frame member 5 has a first surface 5*a* facing the one side in the Z direction, and a second surface 5*b* facing the other side in the Z direction, and is disposed on the disposition surface 3*a* via the second surface 5*b* (in the Z direction). The first surface 5*a* is formed of top surfaces 51*a* to 53*a* of a first wall portion 51, a second wall portion 52, and a pair of third wall portions 53 to be described later. The second surface 5*b* is formed of bottom surfaces 51*b* to 54*b* of the first wall portion 51, the second wall portion 52, the pair of third wall portions 53, and a pair of standing wall portions 54 to be described later. The frame member 5 defines a light passage opening 5*c* on the first surface 5*a*. The light passage opening 5*c* is an opening through which light traveling toward the mirror surface 15*a* of the mirror device 10 or light reflected by the mirror surface 15*a* passes. In FIG. 6, the light passage opening 5*c* is indicated by a broken line. The frame member 5 is disposed to surround the mirror device 10 (mirror surface 15*a*) when viewed in the Z direction. A width of the light passage opening 5*c* in the Y direction is larger than a width W5 of each of the standing wall portions 54 in the Y direction. The standing wall portion 54 and the width W5 thereof will be described later. Accordingly, interference of the light traveling toward the mirror surface 15*a* or the light reflected by the mirror surface 15*a* with the frame member 5 can be suppressed.

The frame member 5 includes the first wall portion 51, the second wall portion 52, the pair of third wall portions 53, and the pair of standing wall portions 54. In this example, the pair of third wall portions 53 are integrally formed with the pair of respective standing wall portions 54. Each of the wall portions 51, 52, and 54 is a solid (having no internal cavity) wall portion having a substantially flat plate shape, and extends along the Z direction. Each of the third wall portions 53 includes, as will be described later, a body portion 531 being solid, having a substantially flat plate shape, and extending along the Z direction. The first wall portion 51 and the second wall portion 52 extend parallel to each other, and face each other in the X direction. The body portions 531 of the pair of third wall portions 53 extend parallel to each other, and face each other in the Y direction. The body portion 531 of one third wall portion 53 is connected to one end of the first wall portion 51 and one end of the second wall portion 52 in the Y direction, and the body portion 531 of the other third wall portion 53 is connected to the other end of the first wall portion 51 and the other end of the second wall portion 52 in the Y direction.

The top surface 51*a* (the surface opposite to the base portion 3) of the first wall portion 51 is inclined with respect to the disposition surface 3*a* (mirror surface 15*a*) so as to become farther from the disposition surface 3*a* of the base portion 3 as the top surface 51*a* becomes closer to the second wall portion 52. The top surface 52*a* (the surface opposite to the base portion 3) of the second wall portion 52 is inclined with respect to the disposition surface 3*a* (mirror surface 15*a*) so as to become closer to the disposition surface 3*a* of the base portion 3 as the top surface 52*a* becomes closer to the first wall portion 51. A height H1 of the first wall portion 51 is lower than a height H2 of the second wall portion 52. The height H1 of the first wall portion 51 is the maximum value of a distance from the disposition surface 3*a* to the top surface 51*a*, and the height H2 of the second wall portion 52 is the maximum value of a distance from the disposition surface 3*a* to the top surface 52*a*.

Figure 5:
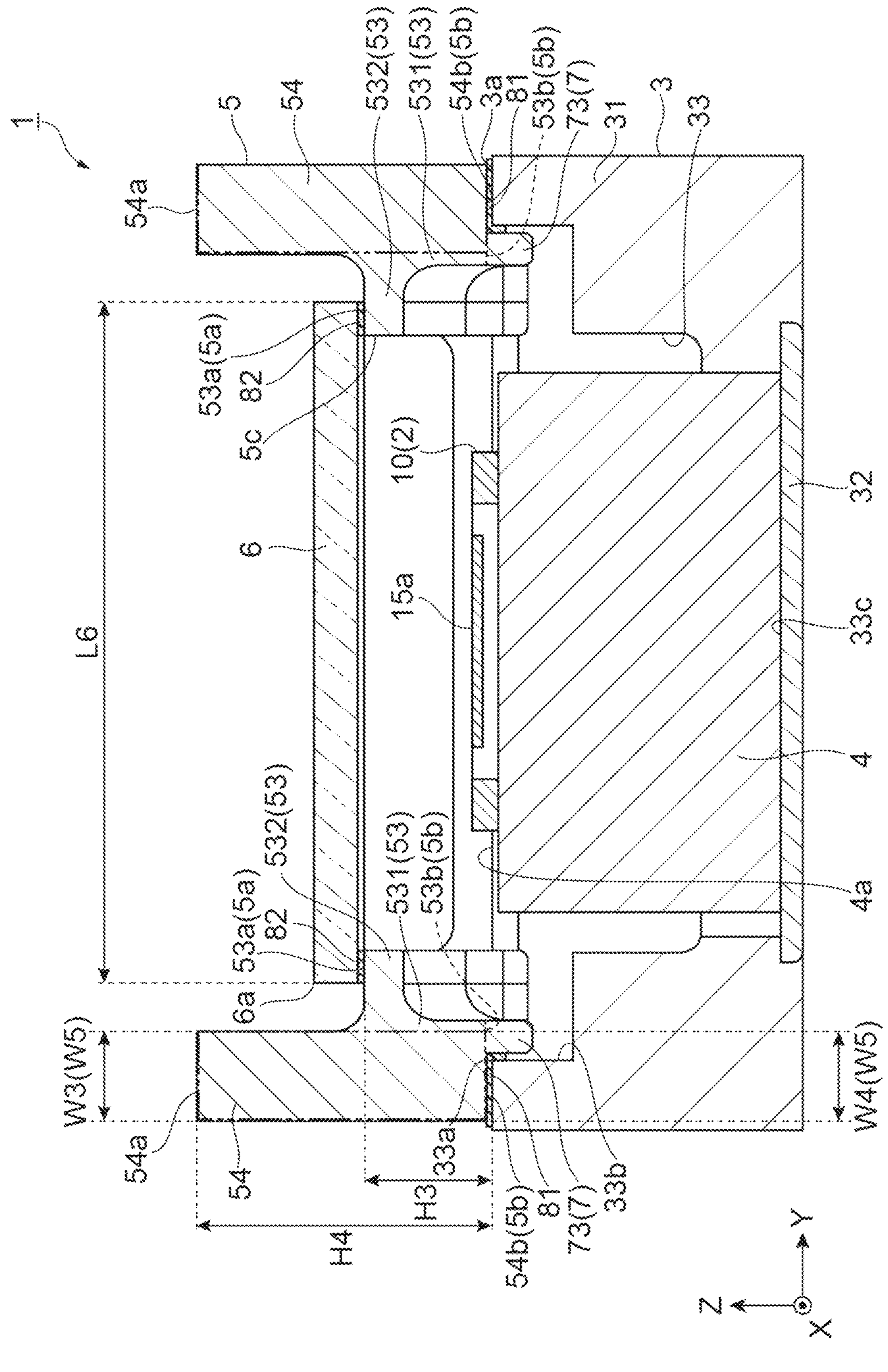
FIG. 5 is a cross-sectional view taken along line V-V of FIG. 2.

Each of the third wall portions 53 includes the body portion 531 having a flat plate shape and extending along a plane perpendicular to the Y direction, and an eave portion 532 protruding inward (toward a mirror device 10 side) from the body portion 531 in the Y direction. The eave portion 532 is provided to extend continuously between the first wall portion 51 and the second wall portion 52 when viewed in the Y direction or the Z direction. In this example, the top surface 53*a* (the surface opposite to the base portion 3) of the third wall portion 53 is formed by the eave portion 532, and the bottom surface 53*b* of the third wall portion 53 is formed by the body portion 531. In FIG. 5, the bottom surface 53*b* is indicated by a broken line.

In this example, when viewed in the Z direction, the frame member 5 is formed in an oblong frame shape having long sides parallel to the Y direction, and a length L3 of the third wall portion 53 in the X direction is shorter than a length L1 of the first wall portion 51 and a length L2 of the second wall portion 52 in the Y direction. In this example, the lengths L1 and L2 are equal to each other, and the length L3 of the third wall portion 53 is equal to a length of the standing wall portion 54 in the X direction.

The top surface 53*a* of the third wall portion 53 is inclined with respect to the disposition surface 3*a* (mirror surface 15*a*) so as to become closer to the disposition surface 3*a* of the base portion 3 as the top surface 53*a* becomes closer to the first wall portion 51 (so as to become farther from the disposition surface 3*a* as the top surface 53*a* becomes closer to the second wall portion 52). In this example, the top surface 53*a* is connected to the top surface 51*a* of the first wall portion 51 and the top surface 52*a* of the second wall portion 52. The top surfaces 51*a* to 53*a* are flush with each other, and are located on the same plane. Namely, the entirety of the first surface 5*a* of the frame member 5 is an inclined surface inclined with respect to the disposition surface 3*a* (mirror surface 15*a*). "Being inclined with respect to the mirror surface 15*a*" refers to being inclined with respect to the mirror surface 15*a* (in this example, the mirror surface 15*a* perpendicular to the Z direction) in a state where the movable portion 13 does not swing.

The window member 6 is disposed on the top surfaces 51*a* to 53*a*. The window member 6 is formed, for example, in a rectangular flat plate shape from a light transmissive material such as glass. In the mirror apparatus 1, light traveling toward the mirror surface 15*a* of the mirror device 10 transmits through the window member 6, and light reflected by the mirror surface 15*a* transmits through the window member 6. By disposing the window member 6 on the top surfaces 51*a* to 53*a*, the window member 6 is inclined with respect to the disposition surface 3*a* (mirror surface 15*a*) so as to become closer to the disposition surface 3*a* of the base portion 3 as the window member 6 becomes closer to the first wall portion 51. In other words, each of the top surfaces 51*a* to 53*a* is inclined at an angle corresponding to the inclination of the window member 6. As will be described later, in this example, gaps G for ventilation are formed between the top surfaces 51*a* and 52*a* and the window member 6. Namely, the window member 6 may be disposed on the top surfaces 51*a* and 52*a* with the gaps G interposed therebetween.

[Projection Portion]

A pair of projection portions 7 are formed on the second surface 5*b* of the frame member 5. The pair of projection portions 7 have shapes that are symmetrical to each other with respect to a plane perpendicular to the Y direction. Each of the projection portions 7 includes a first portion 71 formed on the bottom surface 51*b* of the first wall portion 51; a second portion 72 formed on the bottom surface 52*b* of the second wall portion 52; and a third portion 73 formed on the bottom surface 53*b* of the third wall portion 53 and the bottom surface 54*b* of the standing wall portion 54. The bottom surfaces 51*b* to 54*b* are the surfaces on a base portion 3 side of the wall portions 51 to 54. FIG. 6 shows a view of the frame member 5 and the magnet unit 4 when viewed from the side of the bottom surfaces 51*b* to 54*b*. FIG. 6 shows line III-III, line IV-IV, and line V-V corresponding to line III-III, line IV-IV, and line V-V of FIG. 2, respectively.

The first portion 71 extends straight along the Y direction. In this example, the first portion 71 is formed in an oblong shape having long sides parallel to the Y direction when viewed in the Z direction. The first portion 71 is formed in a substantially rectangular shape in a cross-section perpendicular to the Y direction, and has a uniform cross-sectional shape in the Y direction. The first portion 71 is formed in an inner region of the bottom surface 51*b* of the first wall portion 51 in the X direction. In this example, the first portion 71 is formed to extend along an inner edge of the bottom surface 51*b*.

The second portion 72 extends straight along the Y direction. In this example, the second portion 72 has a shape that is symmetrical to the first portion 71 with respect to a plane perpendicular to the X direction, and extends parallel to the first portion 71. The second portion 72 is formed in an oblong shape having long sides parallel to the Y direction when viewed in the Z direction. The second portion 72 is formed in a substantially rectangular shape in a cross-section perpendicular to the Y direction, and has a uniform cross-sectional shape in the Y direction. The second portion 72 is formed in an inner region of the bottom surface 52*b* of the second wall portion 52 in the X direction. In this example, the second portion 72 is formed to extend along an inner edge of the bottom surface 52*b*.

The third portion 73 extends straight along the X direction. Namely, in this example, the third portion 73 extends perpendicularly to the first portion 71 and the second portion. The third portion 73 is formed in an oblong shape having long sides parallel to the X direction when viewed in the Z direction. The third portion 73 is formed in a substantially rectangular shape in a cross-section perpendicular to the X direction, and has a uniform cross-sectional shape in the X direction. The third portion 73 is connected to the first portion 71 at one end in the X direction, and is connected to the second portion 72 at the other end in the X direction. Namely, the first portion 71, the second portion 72, and the third portion 73 of each of the projection portions 7 are integrally formed. The first portion 71, the second portion 72, and the third portion 73 of each of the projection portions 7 have a substantially C-shape (U-shape) when viewed in the Z direction.

Each of the projection portions 7 is disposed between the magnet unit 4 and the opening edge 33*a* of the recess 33 when viewed in the Z direction (refer to FIG. 6). In this example, each of the projection portions 7 is disposed between the magnet unit 4 and the side surface 33*b* of the recess 33 in directions perpendicular to the Z direction. Namely, each of the projection portions 7 includes a portion located in the recess 33 (a portion located opposite to the window member 6 with respect to the disposition surface 3*a* of the base portion 3). More specifically, the first portion 71 and the second portion 72 are located between the magnet unit 4 and the side surface 33*b* (opening edge 33*a*) in a direction inclined with respect to both the X direction and the Y direction. The third portion 73 is located between the magnet unit 4 and the side surface 33*b* (opening edge 33*a*) in the Y direction. In the Y direction, a distance between the third portion 73 and the side surface 33*b* is shorter than a distance between the third portion 73 and the magnet unit 4.

In each of the projection portions 7, a connecting portion 74 between the first portion 71 and the third portion 73 and a connecting portion 75 between the second portion 72 and the third portion 73 are disposed at locations corresponding to inner corner portions 33*d* of the recess 33 when viewed in the Z direction. In this example, the connecting portions 74 and 75 are disposed to face the inner corner portions 33*d*. The connecting portions 74 and 75 can also be deemed to be disposed at locations corresponding to corners of the magnet unit 4.

Portions of the first surface 5*a* of the frame member 5, which overlap the projection portions 7 in the Z direction (when viewed in the Z direction), are inclined surfaces inclined with respect to the mirror surface 15*a* (disposition surface 3*a*). As described above, in this example, the entirety of the first surface 5*a* is an inclined surface inclined with respect to the mirror surface 15*a*. The window member 6 is disposed on the first surface 5*a* inclined in such a manner. The window member 6 overlaps at least a part of each of the projection portions 7 in the Z direction. In this example, the window member 6 overlaps the first portion 71 and the second portion 72 in the Z direction, but does not overlap the third portion 73.

[Standing Wall Portion]

In FIG. 5, the standing wall portions 54 are indicated by two-dot chain lines. The pair of standing wall portions 54 extend parallel to each other, and face each other in the Y direction. The pair of standing wall portions 54 are disposed outside the pair of third wall portions 53 in the Y direction when viewed in the Z direction (disposed to interpose the pair of third wall portions 53 in the Y direction). In this example, the pair of standing wall portions 54 are integrally formed with the pair of respective third wall portions 53. Each of the standing wall portions 54 is provided to extend continuously between the first wall portion 51 and the second wall portion 52 when viewed in the Y direction.

A top surface 54*a* (a surface opposite to the base portion 3) of each of the standing wall portions 54 includes a flat portion. In this example, the entirety of the top surface 54*a* of the standing wall portion 54 is a flat surface perpendicular to the Z direction. The top surface 54*a* (flat portion) extends parallel to the bottom surface 3*b* (the surface opposite to the disposition surface 3*a*) of the base portion 3. The top surface 54*a* has, for example, an oblong shape having long sides parallel to the X direction when viewed in the Z direction. The entirety of the bottom surface 54*b* (the surface on the base portion 3 side) of the standing wall portion 54 is a flat surface perpendicular to the Z direction. The bottom surface 54*b* has, for example, an oblong shape having long sides parallel to the X direction when viewed in the Z direction. The standing wall portion 54 is a portion of the frame member 5, which extends along the Z direction from the top surface 54*a*, and the bottom surface 54*b* is an end surface of the extending portion on a side opposite to the top surface 54*a*. In this example, the standing wall portion 54 has a uniform cross-sectional shape in the Z direction. The top surface 54*a* and the bottom surface 54*b* have the same shape.

Figure 4:
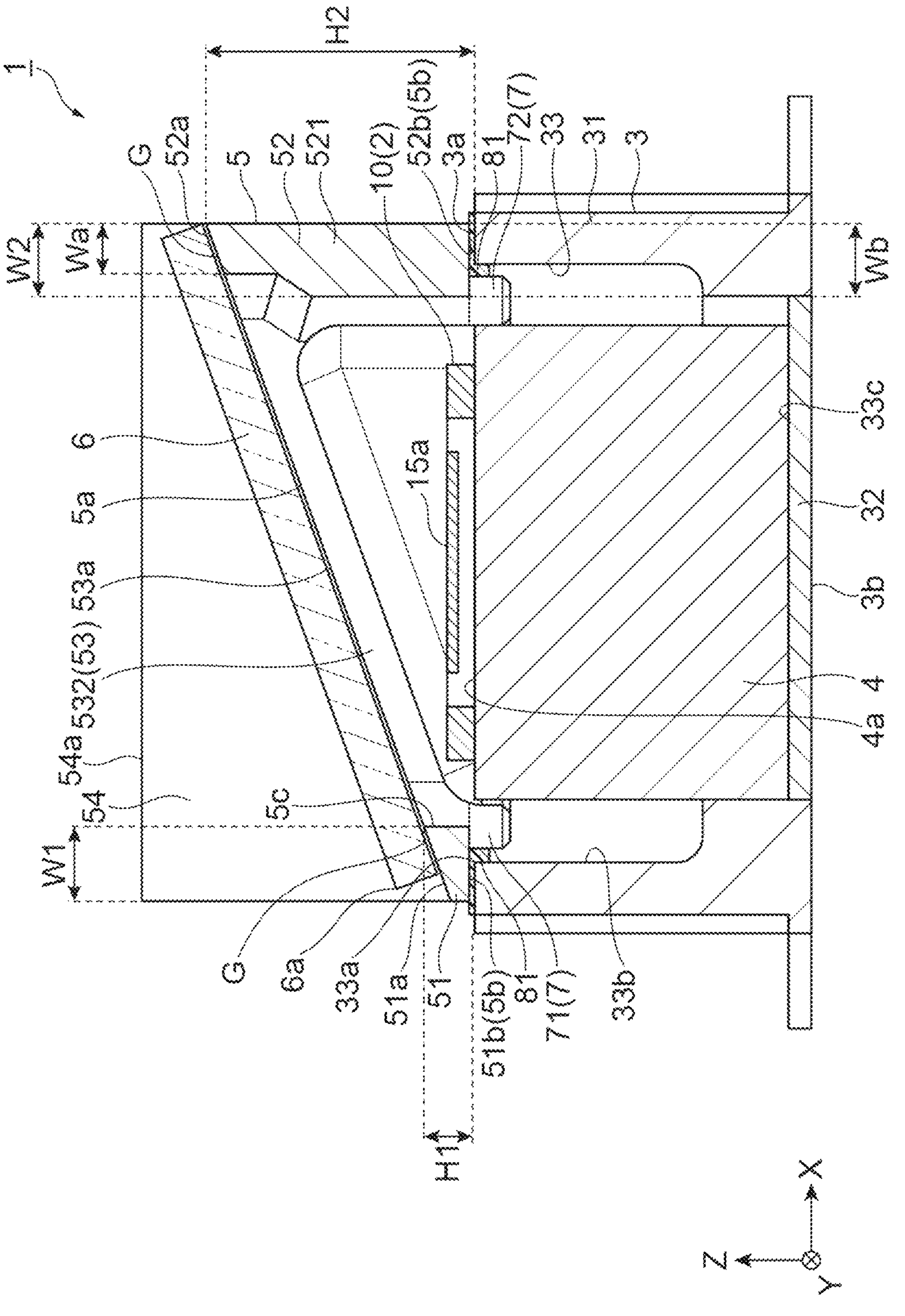
FIG. 4 is a cross-sectional view taken along line IV-IV of FIG. 2.

Each of a width W3 of the top surface 54*a* and a width W4 of the bottom surface 54*b* of the standing wall portion 54 in the Y direction is wider than each of a width W1 of the first wall portion 51 and a width W2 of the second wall portion 52 in the X direction. The width W1 of the first wall portion 51 is the maximum width of the first wall portion 51 in the X direction in a cross-section perpendicular to the Y direction and passing through the center of the mirror 15 (FIG. 4). This point also applies to the second wall portion 52 and the standing wall portion 54. In this example, the width W3 of the top surface 54*a* is equal to the width W4 of the bottom surface 54*b*. A height H4 of the standing wall portion 54 is higher than a height H1 of the first wall portion 51 and a height H2 of the second wall portion 52, and is higher than a height H3 of the third wall portion 53. The height H3 of the third wall portion 53 is the maximum value of a distance from the disposition surface 3*a* of the base portion 3 to the top surface 53*a* of the third wall portion 53. The height H4 of the standing wall portion 54 is the maximum value of a distance from the disposition surface 3*a* of the base portion 3 to the top surface 54*a* of the standing wall portion 54.

The frame member 5 is disposed on the disposition surface 3*a* such that the bottom surface 54*b* of the standing wall portion 54 comes into contact with the disposition surface 3*a* of the base portion 3. As will be described later, in this example, a first adhesive material 81 is disposed between the bottom surface 54*b* and the disposition surface 3*a*. The bottom surface 54*b* being in contact with the disposition surface 3*a* includes not only a case where the bottom surface 54*b* is in direct contact with the disposition surface 3*a*, but also a case where the first adhesive material 81 is disposed between the bottom surface 54*b* and the disposition surface 3*a* as in this example. When viewed in the Z direction, an outer edge of the standing wall portion 54 is not located outside an outer edge of the base portion 3. In this example, when viewed in the Z direction, the outer edge of the standing wall portion 54 is located inside the outer edge of the base portion 3. When viewed in the X direction, in the bottom surface 54*b* of the standing wall portion 54, a width of a portion that is in contact with the disposition surface 3*a* is wider than a width of a portion that is not in contact with the disposition surface 3*a*.

A configuration of each part of the mirror apparatus 1 will be further described with reference to FIGS. 1 to 6. The second wall portion 52 includes a portion 521 that is narrower in width on a top surface 52*a* side than at other portions of the second wall portion 52 (refer to FIG. 4). In the portion 521, a width Wa of the top surface 52*a* is narrower than a width Wb of the bottom surface 52*b*. The portion 521 is provided at an intermediate portion of the second wall portion 52 in the Y direction.

The frame member 5 is fixed to the base portion 3 by the first adhesive material 81. The first adhesive material 81 is an adhesive material made of, for example, an epoxy-based, acrylic-based, or silicone-based material. In this example, the first adhesive material 81 is disposed between the second surface 5*b* of the frame member 5 (the bottom surfaces 51*b* to 54*b* of the wall portions 51 to 54) and the disposition surface 3*a* of the base portion 3 to come into contact with the second surface 5*b* and the disposition surface 3*a*, and is disposed between the projection portions 7 and the side surface 33*b* of the recess 33 to come into contact with the projection portions 7 and the side surface 33*b* (inserted between the projection portions 7 and the side surface 33*b* of the recess 33). In addition, the first adhesive material 81 is disposed between the frame member 5 and the base portion 3 over the entire circumference (to surround the recess 33 when viewed in the Z direction). The first adhesive material 81 is in contact with the first portion 71, the second portion 72, and the third portion 73 of each of the projection portions 7.

The window member 6 is fixed to the top surfaces 53*a* of the pair of third wall portions 53 by a second adhesive material 82. The second adhesive material 82 is an adhesive material made of, for example, an epoxy-based, acrylic-based, or silicone-based material. Gaps between the window member 6 and the top surfaces 53*a* are sealed with the second adhesive material 82 in an airtight manner. On the other hand, the second adhesive material 82 is not disposed between the window member 6 and the top surface 51*a* of the first wall portion 51 and between the window member 6 and the top surface 52*a* of the second wall portion 52, but the gaps G are formed therebetween. Namely, the window member 6 is not fixed to the top surface 51*a* of the first wall portion 51 and the top surface 52*a* of the second wall portion 52. The gaps G function as vents connecting the inside and the outside of the mirror apparatus 1.

In the Z direction, the entirety of the window member 6 is located on the base portion 3 side with respect to the top surface 54*a* of each of the standing wall portions 54. Namely, in the Z direction, the entirety of the window member 6 does not protrude from the top surface 54*a* of each of the standing wall portions 54 to a side opposite to the base portion 3. A length L6 of the window member 6 in the Y direction is longer than a width W5 of each of the standing wall portions 54 in the Y direction. The width W5 of the standing wall portion 54 is the maximum width of the standing wall portion 54 in the Y direction, and is, for example, the wider of the width W3 of the top surface 54*a* and the width W4 of the bottom surface 54*b* of the standing wall portion 54. In this example, since the width W3 is equal to the width W4, the width W5 of the standing wall portion 54 is the width W3 of the top surface 54*a* and is also the width W4 of the bottom surface 54*b*. In addition, in this example, the length L6 of the window member 6 in the Y direction is longer than the sum of the widths W5 of the pair of standing wall portions 54 in the Y direction.

In FIG. 6, the window member 6 is indicated by a broken line. As shown in FIG. 6, when viewed in the Z direction, an outer edge 6*a* of the window member 6 is located outside the light passage opening 5*c* of the frame member 5. Namely, the window member 6 is disposed to cover the entirety of the light passage opening 5*c*. In the X direction, the first portion 71 and the second portion 72 of the projection portion 7 are located inside (the mirror device 10 side) the outer edge 6*a* of the window member 6. In the X direction, an edge of the light passage opening 5*c* of the frame member 5 is located inside (the mirror device 10 side) the outer edge 6*a* of the window member 6. When viewed in the Y direction, the position of the edge of the light passage opening 5*c* of the frame member 5 in the X direction overlaps the positions of the first wall portion 51 and the second wall portion 52 in the X direction. In this example, when viewed in the Y direction, the position of the edge of the light passage opening 5*c* of the frame member 5 in the X direction overlaps the positions of the first portions 71 and the second portions 72 of the projection portions 7 in the X direction. In the Y direction, the edge of the light passage opening 5*c* of the frame member 5 is located inside (the mirror device 10 side) the outer edge 6*a* of the window member 6. In the Y direction, the edge of the light passage opening 5*c* of the frame member 5 and the outer edge 6*a* of the window member 6 are located inside the third portions 73 of the projection portions 7. The top surface 53*a* of the third wall portion 53 has a portion overlapping the third portion 73 of the projection portion 7 in the Z direction.

[Actions and Effects]

In the mirror apparatus 1, the height H1 of the first wall portion 51 is lower than the height H2 of the second wall portion 52, and the window member 6 is disposed on the top surface 51*a* of the first wall portion 51 and the top surface 52*a* of the second wall portion 52, and is inclined with respect to the mirror surface 15*a*. Accordingly, a direction in which light reflected by the window member 6 travels can be made different from a direction in which light reflected by the mirror surface 15*a* travels, and the occurrence of a situation where the light reflected by the window member 6 becomes noise light can be suppressed. In addition, the top surface 54*a* of each of the standing wall portions 54 includes a flat portion. Accordingly, even when the window member 6 is disposed at an angle, the mirror apparatus 1 can be accurately mounted by using the flat portion as a reference. In addition, the width W3 of the top surface 54*a* of each of the standing wall portions 54 is wider than the width W1 of the first wall portion 51 and the width W2 of the second wall portion 52. Accordingly, for example, during mounting, the top surfaces 54*a* of the standing wall portions 54 are easily suctioned by an automatic machine using a collet or the like, so that the mounting of the mirror apparatus 1 can be facilitated. Further, the width W4 of the bottom surface 54*b* of each of the standing wall portions 54 is wider than the width W1 of the first wall portion 51 and the width W2 of the second wall portion 52, and the bottom surface 54*b* of each of the standing wall portions 54 is in contact with the base portion 3. Accordingly, the frame member 5 can be firmly fixed to the base portion 3, and the rigidity of a package including the base portion 3 and the frame member 5 can be increased (particularly, the rigidity against an external force in the Z direction can be increased). In addition, since the width W3 of the top surface 54*a* and the width W4 of the bottom surface 54*b* of each of the standing wall portions 54 are wider than the width W1 of the first wall portion 51 and the width W2 of the second wall portion 52, the strength of the standing wall portions 54 can be increased, and for example, when a jig for suction or the like is brought into contact with (butted against) the top surfaces 54*a* of the standing wall portions 54 during mounting, damage to the standing wall portions 54 can be suppressed. Therefore, according to the mirror apparatus 1, even when the window member 6 is arranged at an angle, the mirror apparatus 1 can be suitably mounted.

The length L6 of the window member 6 in the Y direction (the third direction perpendicular to the first direction and the second direction) is longer than the width W5 of each of the standing wall portions 54 in the X direction (the second direction perpendicular to the first direction). Accordingly, the blocking of light traveling toward the mirror surface 15*a* or light reflected by the mirror surface 15*a* by the standing wall portions 54 can be suppressed.

The length L6 of the window member 6 in the Y direction is longer than the sum of the widths W5 of the pair of standing wall portions 54 in the X direction. Accordingly, the blocking of light traveling toward the mirror surface 15*a* or light reflected by the mirror surface 15*a* by the standing wall portions 54 can be suppressed.

The second wall portion 52 includes the portion 521 in which the width Wa of the top surface 53*a* in the X direction is narrower than the width Wb of the bottom surface 52*b* in the X direction. Accordingly, the blocking of light traveling toward the mirror surface 15*a* or light reflected by the mirror surface 15*a* by the second wall portion 52 higher than the first wall portion 51 can be suppressed.

The height H4 of each of the standing wall portions 54 is higher than the height H2 of the second wall portion 52. Accordingly, the mounting of the mirror apparatus 1 can be easily performed with reference to the top surfaces 54*a* of the standing wall portions 54.

In the Z direction (first direction), the entirety of the window member 6 is located on the base portion 3 side with respect to the top surface 54*a* of each of the standing wall portions 54. Accordingly, the mounting of the mirror apparatus 1 can be easily performed with reference to the top surfaces 54*a* of the standing wall portions 54.

The frame member 5 is fixed to the base portion 3 by the first adhesive material 81, and the first adhesive material 81 is disposed between the frame member 5 and the base portion 3 over the entire circumference. Accordingly, the frame member 5 can be firmly fixed to the base portion 3.

The pair of standing wall portions 54 are disposed outside the pair of third wall portions 53 when viewed from the Z direction. Accordingly, the strength of the frame member 5 can be increased, and for example, when a jig for suction or the like is brought into contact with the top surfaces 54*a* of the standing wall portions 54 during mounting, damage to the frame member 5 caused by stress generated in the standing wall portions 54 can be suppressed.

The window member 6 is fixed to the top surfaces 53*a* of the pair of third wall portions 53 by the second adhesive material 82. Accordingly, for example, compared to a case where the window member 6 is fixed to the top surface 51*a* of the first wall portion 51 that has a low height and that is likely to bend, the bending of the frame member 5 when fixed can be suppressed.

The pair of standing wall portions 54 are integrally formed with the pair of respective third wall portions 53. Accordingly, the strength of the frame member 5 can be increased. In addition, the molding of the frame member 5 can be facilitated.

The gaps G are formed between the window member 6 and the top surface 51*a* of the first wall portion 51 and between the window member 6 and the top surface 52*a* of the second wall portion 52. Accordingly, the occurrence of dew condensation inside the mirror apparatus 1 can be suppressed.

The base portion 3 has the disposition surface 3*a* on which the frame member 5 is disposed, the recess 33 that is open on the disposition surface 3*a* is formed in the base portion 3, and the magnet unit 4 is disposed in the recess 33. In the mirror apparatus 1 as well, the above-described effect that the mirror apparatus 1 can be suitably mounted even when the window member 6 is disposed at an angle is achieved.

The bottom surface 3*b* (the surface opposite to the disposition surface 3*a*) of the base portion 3 extends parallel to the flat portions. Accordingly, the mounting of the mirror apparatus 1 with reference to the flat portions can be further facilitated.

Each of the standing wall portions 54 extends continuously between the first wall portion 51 and the second wall portion 52 when viewed in the Y direction. Accordingly, the mounting of the mirror apparatus 1 with reference to the top surfaces 54*a* of the standing wall portions 54 can be further facilitated.

The axis A of the mirror device 10 (mirror unit 2) is parallel to the Y direction. In the mirror apparatus 1 as well, the above-described effect that the mirror apparatus 1 can be suitably mounted even when the window member 6 is disposed at an angle is achieved.

Modification Examples

The present disclosure is not limited to the embodiment and modification examples. The material and shape of each configuration are not limited to the material and shape described above, and various materials and shapes can be adopted. The length L1 of the first wall portion 51 and the length L2 of the second wall portion 52 in the Y direction may be shorter than the length L3 of each of the third wall portions 53 in the X direction, or may be equal to the length L3.

The projection portions 7 may be formed in a ring shape to surround the magnet unit 4 when viewed in the Z direction. For example, the projection portions 7 may be formed of one portion having a rectangular ring shape when viewed in the Z direction. In this case, for example, the first portion 71 and the second portion 72 form a pair of side portions facing each other in the X direction, and the pair of third portions 73 form a pair of side portions facing each other in the Y direction.

Each of the projection portions 7 may include only one of the first portion 71, the second portion 72, and the third portion 73, or may include only two. The first portion 71 and the second portion 72 may be formed in any shape, and may not extend along the Y direction. The third portion 73 may be formed in any shape, and may not extend along the X direction. The third portion 73 may not be connected to one of or both the first portion 71 and the second portion 72. Each of the projection portions 7 may not include the portions disposed at the locations corresponding to the inner corner portions 33*d* of the recess 33 when viewed in the Z direction.

The projection portions 7 may be disposed between the magnet unit 4 and the opening edge 33*a* (side surface 33*b*) of the recess 33, and may be in contact with the magnet unit 4 or may be spaced apart from the magnet unit 4. The projection portions 7 may be in contact with the opening edge 33*a* (side surface 33*b*), or may be spaced apart from the opening edge 33*a*. The projection portions 7 may not be formed. In this case, the entirety of the bottom surface 54*b* of each of the standing wall portions 54 may be in contact with the base portion 3. Accordingly, the frame member 5 can be more firmly fixed to the base portion 3.

In the embodiment, the entirety of the first surface 5*a* of the frame member 5 is an inclined surface inclined with respect to the mirror surface 15*a*; however, a region in which the window member 6 is disposed may be an inclined surface, and the entirety of the first surface 5*a* may not be an inclined surface. Namely, at least parts of portions of the first surface 5*a*, which overlap the projection portions 7 in the Z direction, may be inclined surfaces, and the portions of the first surface 5*a*, which overlap the projection portions 7 in the Z direction, may include regions extending parallel to the mirror surface 15*a*. For example, in the embodiment, regions of the first surface 5*a*, which overlap the third portions 73 in the Z direction, may be flat surfaces parallel to the mirror surface 15*a*. In the embodiment, the window member 6 overlaps the first portion 71 and the second portion 72 in the Z direction, and does not overlap the third portion 73; however, the window member 6 may overlap the entirety of the projection portion 7 in the Z direction.

In the embodiment, the standing wall portions 54 are integrally formed with the third wall portions 53; however, the standing wall portions 54 may be formed separately from the third wall portions 53. For example, the standing wall portions 54 may be provided apart from the third wall portions 53 in the Y direction. In the embodiment, the standing wall portions 54 have been described as being deemed to be portions separate from the third wall portions 53; however, as in the embodiment, in a case where the standing wall portions 54 are integrally formed with the third wall portions 53, the standing wall portions 54 can also be deemed to be parts of the third wall portions 53. The standing wall portions 54 may be omitted.

The second wall portion 52 may not include the portion 521 in which the width Wa of the top surface 53*a* in the X direction is narrower than the width Wb of the bottom surface 52*b* in the X direction, and may have a uniform width in the Z direction. The first portions 71 and the second portions 72 of the projection portions 7 may be located outside (side opposite to the mirror unit 2) the outer edge 6*a* of the window member 6 in the X direction. In the X direction, the edge of the light passage opening 5*c* of the frame member 5 may be located inside the first wall portion 51 and the second wall portion 52, or may be located outside the first wall portion 51 and the second wall portion 52. Namely, when viewed in the Y direction, the position of the edge of the light passage opening 5*c* of the frame member 5 in the X direction may not overlap the positions of the first wall portion 51 and the second wall portion 52 in the X direction.

A method for fixing the frame member 5 and the base portion 3 is not limited to adhesion, and may be any method, and the first adhesive material 81 may be omitted. The first adhesive material 81 may not be disposed between the projection portions 7 and the side surface 33*b* of the recess 33, and may be disposed, for example, only between the second surface 5*b* of the frame member 5 and the disposition surface 3*a* of the base portion 3. The first adhesive material 81 may not necessarily be disposed between the frame member 5 and the base portion 3 over the entire circumference, and may be disposed, for example, only at a part in a circumferential direction.

A method for fixing the window member 6 and the frame member 5 is not limited to adhesion, and may be any method, and the second adhesive material 82 may be omitted. The second adhesive material 82 may be disposed between the window member 6 and the first surface 5*a* of the frame member 5 over the entire circumference. Namely, in the embodiment, the second adhesive material 82 may also be disposed between the window member 6 and the top surface 51*a* of the first wall portion 51 and between the window member 6 and the top surface 52*a* of the second wall portion 52. In this case, the gaps G are not formed between the window member 6 and the top surfaces 51*a* and 52*a*. In the embodiment, the gaps G are formed both between the window member 6 and the top surface 51*a* and between the window member 6 and the top surface 52*a*; however, the gap G may be formed only between the window member 6 and the top surface 51*a* or between the window member 6 and the top surface 52*a*.

When viewed in the Z direction, the outer edge 10*a* of the mirror device 10 (mirror unit 2) may be located outside the outer edge 4*b* of the magnet unit 4, or may overlap the outer edge 4*b* of the magnet unit 4 (may coincide therewith). The axis A of the mirror device 10 may not necessarily be parallel to the Y direction.

In the embodiment, the projection portions 7 is disposed between the magnet unit 4 and the side surface 33*b* of the recess 33 in the directions perpendicular to the Z direction; however, the projection portions 7 may be disposed between the magnet unit 4 and the opening edge 33*a* of the recess 33 when viewed in the Z direction, and may not necessarily be disposed between the magnet unit 4 and the side surface 33*b* of the recess 33 in the directions perpendicular to the Z direction. For example, when the top surface 4*a* of the magnet unit 4 is lower than the disposition surface 3*a* of the base portion 3 (located opposite to the window member 6 in the Z direction), the projection portions 7 may face the side surface 33*b* of the recess 33 in the directions perpendicular to the Z direction, but may not face the magnet unit 4. The first adhesive material 81 may not be disposed between the bottom surfaces 54*b* of the standing wall portions 54 and the base portion 3.

The length L6 of the window member 6 may be shorter than the sum of the widths (W5+W5) of the pair of standing wall portions 54, or may be shorter than the width W5 of each of the standing wall portions 54. The height H4 of each of the standing wall portions 54 may be lower than the height H2 of the second wall portion 52. At least a part of the window member 6 may be located opposite to the base portion 3 with respect to the top surface 54*a* of each of the standing wall portions 54. Namely, in the Z direction, at least a part of the window member 6 may protrude from the top surface 54*a* of each of the standing wall portions 54 to the side opposite to the base portion 3. The magnet unit 4 may not necessarily disposed in the recess 33 formed in the base portion 3, and may be disposed, for example, on a surface (for example, the disposition surface 3*a*) of the base portion 3.

The standing wall portions 54 may not be provided to extend continuously between the first wall portion 51 and the second wall portion 52 when viewed in the Y direction. Each of the standing wall portions 54 may include two or more separated portions, and may include, for example, a first portion disposed on a first wall portion 51 side, and a second portion spaced apart from the first portion and disposed on a second wall portion 52 side. The standing wall portions 54 may extend along a direction intersecting an extending direction of the first wall portion 51 and the second wall portion 52 when viewed in the Z direction, and as in the embodiment, may not necessarily extend along a direction orthogonal to the extending direction of the first wall portion 51 and the second wall portion 52. In the embodiment, the entirety of the top surface 54*a* of the standing wall portion 54 is a flat surface; however, at least a part of the top surface 54*a* may be a flat portion, and the top surface 54*a* may include a portion that is not flat. The standing wall portions 54 may not have a uniform cross-sectional shape in the Z direction. For example, the standing wall portions 54 may have a cross-sectional shape different from those of the top surface 54*a* and the bottom surface 54*b*, at intermediate portions in the Z direction.

What is claimed is:

1. A mirror apparatus comprising:

a base portion;

a mirror unit including a movable portion configured to swing around a predetermined axis, and a mirror surface formed on the movable portion, and disposed on the base portion in a first direction;

a frame member disposed on the base portion; and a window member disposed on the frame member, wherein the frame member includes a first wall portion, a second wall portion facing the first wall portion in a second direction perpendicular to the first direction, and a pair of standing wall portions facing each other in a third direction perpendicular to the first direction and the second direction, a height of the first wall portion is lower than a height of the second wall portion, the window member is disposed on a top surface of the first wall portion and a top surface of the second wall portion, and is inclined with respect to the mirror surface, a top surface of each of the pair of standing wall portions includes a flat portion, a width of the top surface and a width of a bottom surface of each of the pair of standing wall portions in the third direction are wider than a width of the first wall portion and a width of the second wall portion in the second direction, and at least a part of the bottom surface of each of the pair of standing wall portions is in contact with the base portion.

2. The mirror apparatus according to claim 1, wherein an entirety of the bottom surface of each of the pair of standing wall portions is in contact with the base portion.

3. The mirror apparatus according to claim 1, wherein a length of the window member in the third direction is longer than a width of each of the pair of standing wall portions in the third direction.

4. The mirror apparatus according to claim 1, wherein a length of the window member in the third direction is longer than a sum of widths of the pair of standing wall portions in the third direction.

5. The mirror apparatus according to claim 1, wherein the second wall portion includes a portion in which a width of the top surface in the second direction is narrower than a width of a bottom surface in the second direction.

6. The mirror apparatus according to claim 1, wherein a height of each of the pair of standing wall portions is higher than the height of the second wall portion.

7. The mirror apparatus according to claim 1, wherein in the first direction, an entirety of the window member is located on a base portion side with respect to the top surface of each of the pair of standing wall portions.

8. The mirror apparatus according to claim 1, wherein the frame member is fixed to the base portion by a first adhesive material, and the first adhesive material is disposed between the frame member and the base portion over an entire circumference.

9. The mirror apparatus according to claim 1, wherein the frame member further includes a pair of third wall portions facing each other in the third direction, and the pair of standing wall portions are disposed outside the pair of third wall portions when viewed in the first direction.

10. The mirror apparatus according to claim 9, wherein the window member is fixed to top surfaces of the pair of third wall portions by a second adhesive material.

11. The mirror apparatus according to claim 9, wherein the pair of standing wall portions are integrally formed with the pair of respective third wall portions.

12. The mirror apparatus according to claim 1, wherein a gap is formed at least one of between the window member and the top surface of the first wall portion and between the window member and the top surface of the second wall portion.

13. The mirror apparatus according to claim 1, further comprising:

a magnet unit, wherein the base portion includes a disposition surface on which the frame member is disposed, and a recess that is open on the disposition surface is formed in the base portion, and the magnet unit is disposed in the recess.

14. The mirror apparatus according to claim 13, wherein a surface of the base portion on a side opposite to the disposition surface extends parallel to the flat portion.

15. The mirror apparatus according to claim 1, wherein each of the pair of standing wall portions extends continuously between the first wall portion and the second wall portion when viewed in the third direction.

16. The mirror apparatus according to claim 1, wherein the axis is parallel to the third direction.

* * * * *